United States Patent [19]
Love et al.

[11] 3,982,523
[45] Sept. 28, 1976

[54] MOUNTING MEANS FOR A DOMESTIC GAS OVEN BURNER ORIFICE MEMBER

[75] Inventors: John J. Love; Thomas P. Fleer, both of St. Louis, Mo.

[73] Assignee: Emerson Electric Co., St. Louis, Mo.

[22] Filed: June 3, 1974

[21] Appl. No.: 475,754

[52] U.S. Cl. ............................ 126/19 R; 126/39 R; 126/39 E; 431/354; 48/180 F; 239/391; 239/396
[51] Int. Cl.² ............................................ A21B 1/00
[58] Field of Search ................... 239/390, 391, 396; 431/343, 354, 355; 126/39 R, 39 E, 19 R; 48/180 F, 180 C

[56] References Cited
UNITED STATES PATENTS

| | | | |
|---|---|---|---|
| 2,162,374 | 6/1939 | Chambers | 431/343 |
| 2,815,070 | 12/1957 | Lamar | 48/180 F |
| 3,118,436 | 1/1964 | Keating | 126/19 |
| 3,148,674 | 9/1964 | Boardman et al. | 126/19 |

FOREIGN PATENTS OR APPLICATIONS

| | | | |
|---|---|---|---|
| 534,538 | 1/1955 | Belgium | 239/396 |
| 534,495 | 1/1955 | Belgium | 239/396 |
| 1,155,016 | 7/1956 | France | 239/391 |

*Primary Examiner*—Carroll B. Dority, Jr.
*Attorney, Agent, or Firm*—Charles E. Markham

[57] ABSTRACT

A burner orifice member for a detachably mounted gas oven burner is mounted directly on the end of the burner gas supply conduit by screw-threaded engagement, and the end portion of the gas supply conduit is rigidly connected to the oven wall by bracket means, with the orifice member in fixed alignment with the burner inlet.

3 Claims, 6 Drawing Figures

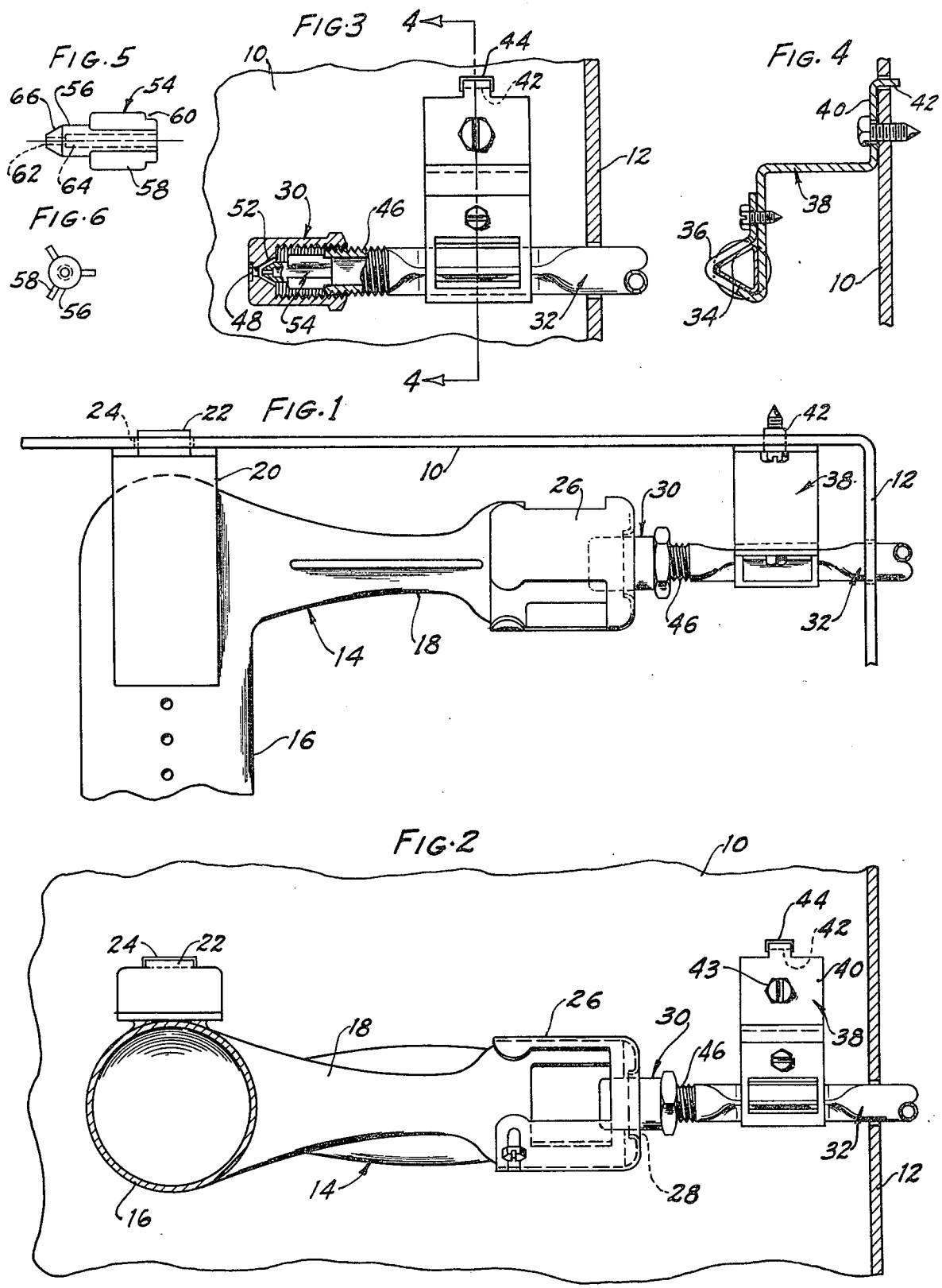

MOUNTING MEANS FOR A DOMESTIC GAS OVEN BURNER ORIFICE MEMBER

Conventionally, the burners in domestic gas range ovens are freely supported on brackets entering slots in the side walls of the oven, so that they may be conveniently removed for cleaning. The burner orifice member and the end portion of the gas supply line leading to the burner are, however, rigidly connected to the oven wall so that the orifice member must be entered into the burner inlet to insure correct repositioning of the burner after removal for cleaning.

In order to support the end of the supply conduit and the orifice member in a fixed position, it is currently the practice to provide a brass casting to which the end of the gas supply tube and burner orifice member are separately connected. The casting is then securely fastened to the oven wall. While this means of mounting the burner orifice member in a fixed position and connecting the end of the gas conduit in communication with the orifice member is functionally quite satisfactory, it is more costly and complex than necessary. That is to say, the provision of the casting with the required machining thereof and the provision of a compression fitting required to connect the supply conduit to the casting, both of which are usually brass, may be dispensed with in a simple and less costly arrangement.

It is, therefore, an object of this invention to provide a particularly simple and economical arrangement for connecting the burner orifice member to the end of the gas supply conduit in fluid communication therewith and for rigidly supporting the end of the supply conduit and the burner orifice member in axial alignment with the inlet of the burner mixing tube.

More specifically, an object of the invention is to mount the burner orifice member directly on the end of the gas supply conduit and to rigidly support the end portion of the gas supply conduit so that the orifice member is in axial alignment with the burner inlet.

Other objects and advantages will appear from the following description when read in connection with the accompanying drawing.

In the drawing:

FIG. 1 is a fragmentary top plan view of an oven wall with a burner detachably mounted thereon and a burner orifice member mounted on the end of a gas supply conduit and supported in a fixed position in the burner inlet in accordance with the present invention;

FIG. 2 is a projected elevational view of FIG. 1;

FIG. 3 is an enlarged fragmentary portion of FIG. 2 showing the burner orifice member and the end of the gas supply conduit in cross-section;

FIG. 4 is a cross-sectional view taken along line 4—4 of FIG. 3; and

FIGS. 5 and 6 are enlarged side and end elevational views of a secondary coaxial orifice member supported in the end of the gas supply conduit.

Referring to the drawing in more detail, a fragmentary portion of a vertical side wall and a front wall of a domestic gas range oven are indicated at 10 and 12, respectively. A burner generally indicated at 14 has a burner head portion 16 and a venturi portion 18. The burner is conveniently arranged so that the head portion 16 extends between opposite side walls, with the venturi portion 18 formed at 90° to the head portion so that the axis of the inlet is perpendicular to the front oven wall 12.

Bracket means 20, welded to the ends of the burner head, have formed tongues 22 received in slots 24 in the oven side walls, whereby the burner is supported for convenient removal. The inlet end of the venturi portion 18 is provided with a conventional cup-shaped adjustable air shutter 26 having an opening 28 in the bottom thereof which receives a burner orifice member 30.

A round tubular supply conduit 32 extends through an opening in the front oven wall 12 in axial alignment with the burner inlet 28. A portion of the round supply conduit adjacent the burner inlet is swaged to a non-circular, cross-sectional shape, as indicated at 34 in FIG. 4, and is clamped in one formed end portion 36 of a bracket 38. The opposite end portion 40 of bracket 38 lies flat against the side wall 10 and is attached thereto by a drive screw 42. The clamp portion 40 is provided at its end with a right-angularly formed tongue portion 42 which enters a locating aperture 44 in the wall 10. The end of supply conduit 32 is externally screw threaded, as indicated at 46.

The generally cup-shaped orifice member 30 is internally screw threaded and receives the screw-threaded end portion 46 of the supply conduit in threaded engagement. The open end of orifice member 30 is provided with a hexagonal portion 50 to facilitate turning the orifice member with a wrench. The closed end wall of orifice member 30 has an orifice 48 drilled therein and a tapered approach bore 52 leading thereto.

There is a secondary orifice member 54 comprising an elongated cylindrical body 56 with radially extending ribs 58 coextending with a rear portion of the body. The ribs are notched at the rear end of the orifice member at 60 so as to snugly fit into the end of the supply conduit and so as to form shoulders to limit entry into the supply conduit. The cylindrical body 56 of the secondary orifice member is smaller in diameter than the internal diameter of the supply conduit so that gas may flow through the main orifice member 30 between the ribs 58.

The secondary orifice member 54 has an orifice 62 drilled through a forward end portion thereof and a counterbore 64 extending therefrom to the rear end. The orifice 62 of the secondary orifice member 54 is smaller in diameter than the orifice 48 in orifice member 30.

The forward end of the cylindrical body 56 of secondary orifice member 54 is tapered at 66 and is adapted to seat in substantially fluid-sealing relationship in the tapered approach bore 52 in orifice member 30. When orifice member 30 is screwed on the end of supply conduit 32 to the extent shown in FIG. 3, fuel to the burner is metered by the orifice 48 in orifice member 30. When the orifice member 30 is screwed further on the supply conduit, until the tapered end 66 seats in the tapered approach bore 52, fuel to the burner is metered by orifice 62. This arrangement facilitates a convenient switchover from a gas of lower heat value to one of higher heat value or vice versa.

To preclude inadvertent axial movement of the orifice member 30, the fit of the threads may be made tight or a suitable cement may be applied to the screw threads at the time of installation.

We claim:

1. In a gas range oven, a gas burner having an inlet, means supporting said burner in position in said oven for convenient removal and replacement, a gas supply conduit of circular cross-section having an end portion extending into said oven in axial alignment with said burner inlet, said conduit being externally screw threaded at its end and having a non-circular locating portion formed therein near its end, a generally cup-shaped orifice member having an internally threaded side wall and a metering orifice in its bottom wall mounted in screw-threaded engagement on the end of said conduit, means for fixing the end of said conduit axially and longitudinally, comprising: a bracket having a first portion formed with surfaces lying parallel with and against the surfaces of said non-circular portion of said conduit and a second portion including a locating tang entered into a locating aperture in a wall of said oven, means clamping said first portion of said bracket to said conduit and means rigidly attaching said second bracket portion to the oven wall.

2. The arrangement claimed in claim 1 which further includes a secondary elongated orifice member within said cup-shaped orifice member, said secondary orifice member having an axial fluid passageway therethrough including a short forward portion thereof forming a metering orifice of smaller diameter than the metering orifice in the bottom of said cup-shaped orifice member, said secondary orifice member being smaller in diameter than the internal diameter of said supply conduit and being shorter than the internal length of said cup-shaped orifice member when said cup-shaped orifice member is screwed on said supply conduit a predetermined amount, said secondary orifice member being provided with longitudinally extending radial fins having cut back rear-end portions thereof in snug interfitting engagement in the end of said supply conduit, and the forward end of said shorter secondary orifice member being arranged to seat against an inner surface of the bottom of said cup-shaped orifice member surrounding the metering orifice therethrough, thereby to restrict flow to that passing through the smaller secondary orifice member when said cup-shaped orifice member is screwed on said supply conduit as far as it will go.

3. The arrangement claimed in claim 2 in which there is a tapered internal annular seat surrounding the metering orifice in the bottom of said cup-shaped orifice member and in which said shorter secondary orifice member has a substantially similarly tapered forward end portion adapted to engage said seat when said cup-shaped orifice member is screwed on said supply conduit as far as it will go.

* * * * *